(12) United States Patent
Hamada et al.

(10) Patent No.: US 7,597,977 B2
(45) Date of Patent: Oct. 6, 2009

(54) DIAGNOSTIC METHOD FOR FUEL CELL (75) Inventors: Shigetaka Hamada, Toyota (JP);
Masaaki Kondo, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 158 days.

(21) Appl. No.: 10/735,694

(22) Filed: Dec. 16, 2003

(65) Prior Publication Data

US 2004/0124843 A1  Jul. 1, 2004

(30) Foreign Application Priority Data

Dec. 17, 2002  (JP)  ............... 2002-364694

(51) Int. Cl.
*H01M 8/04*  (2006.01)
*H01M 8/12*  (2006.01)

(52) U.S. Cl. ............... 429/25; 320/101; 429/13; 429/23; 429/24

(58) Field of Classification Search ............... 320/101; 429/24, 25
See application file for complete search history.

(56) References Cited

U.S. PATENT DOCUMENTS

| 5,215,834 | A  | * | 6/1993  | Reher et al. ............... 429/62 |
| 6,322,917 | B1 | * | 11/2001 | Acker ............... 429/17 |
| 6,558,824 | B1 | * | 5/2003  | Muchnic et al. ............... 429/13 |
| 6,586,123 | B1 | * | 7/2003  | Yi et al. ............... 429/13 |
| 6,709,779 | B2 | * | 3/2004  | Uozumi ............... 429/24 |
| 6,777,121 | B1 | * | 8/2004  | Shimanuki et al. ............... 429/23 |
| 7,122,263 | B2 | * | 10/2006 | Imamura et al. ............... 429/25 |
| 2003/0219641 | A1 | * | 11/2003 | Petillo ............... 429/38 |
| 2004/0106022 | A1 | * | 6/2004  | Saito et al. ............... 429/22 |
| 2006/0035118 | A1 | * | 2/2006  | Coerlin et al. ............... 429/13 |

FOREIGN PATENT DOCUMENTS

DE  196 49 434 C1  1/1998
JP  A 9-027336  1/1997

* cited by examiner

*Primary Examiner*—Edward Tso
*Assistant Examiner*—Samuel Berhanu
(74) *Attorney, Agent, or Firm*—Kenyon & Kenyon LLP (57) ABSTRACT

In a diagnostic method for a fuel cell, the amount of cross leak is determined by supplying the anode of the fuel cell with a hydrogen or hydrogen-containing gas, and supplying the cathode with an inert gas or vacuuming the cathode, and measuring the voltage of each cell.

9 Claims, 5 Drawing Sheets

DIAGNOSTIC METHOD FOR FUEL CELL

INCORPORATION BY REFERENCE

The disclosure of Japanese Patent Application No. 2002-364694 filed on Dec. 17, 2002 including the specification, drawings and abstract of the same, is incorporated herein by reference in its entirety.

BACKGROUND OF THE INVENTION

1. Field of the Invention

The invention relates to a diagnostic method for a fuel cell such as low-temperature fuel cells including polymer electrolyte fuel cells and the like. More particularly the invention relates to a fuel cell diagnostic method concerned with cross-leak of an electrolyte membrane.

2. Description of the Related Art

A polymer electrolyte fuel cell is formed by a stack that includes membrane-electrode assemblies (MEA) and separators. A membrane-electrode assembly is made up of an electrolyte membrane formed by an ion-exchange membrane, an electrode (anode or fuel electrode) formed by a catalyst layer that is disposed on a surface of the electrolyte membrane, and an electrode (cathode or air electrode) formed by a catalyst layer that is disposed on another surface of the electrolyte membrane. Diffusion layers are provided between the membrane-electrode assembly and a separator disposed at the anode side and between the membrane-electrode assembly and a separator disposed at the cathode side. Each separator has a fuel gas channel for supplying a fuel gas (such as hydrogen) to the anode, and an oxidizing gas channel for supplying an oxidizing gas (such as oxygen, or air in ordinary cases) to the cathode. Each separator further has a coolant channel for conducting a coolant (cooling water in ordinary cases). A fuel cell stack is formed by stacking modules each of which includes at least one cell that is formed by stacking a membrane-electrode assembly and separators. Terminals, insulators, and end plates are disposed on two opposite ends of a cell stack in the cell stacking direction. The cell stack is clamped in the cell stacking direction, and is fixed through the use of fastener members (e.g., tension plates) that extend outside the cell stack in the cell stacking direction, and also through the use of bolts and nuts. In this manner, a stack is formed. On the anode side of each cell, a reaction occurs in which hydrogen is separated into hydrogen ions (protons) and electrons. The hydrogen ions migrate through the electrolyte membrane to the cathode side. On the cathode side, oxygen, hydrogen ions and electrons (i.e., electrons produced on the anode side of the adjacent MEA come to the cathode through the separator, or electrons produced on the anode side of the cell disposed at an end of the cell stack come to the cathode of the cell disposed at the opposite end via an external circuit) react to produce water as expressed below.

Anode side: $H_2 \rightarrow 2H^+ + 2e^-$.

Cathode side: $2H^+ + 2e^- + (1/2)O_2 \rightarrow H_2O$

The electrolyte membrane is required to allow only protons to migrate through the membrane in the direction of thickness of the membrane. In reality, however, a very small amount of hydrogen migrates through the thickness of the membrane from the anode side to the cathode side, or a very small amount of air migrates through the thickness of membrane from the cathode side to the anode side (this phenomenon is termed "cross-leak"). Such passage of hydrogen or oxygen across the membrane results in a reaction between hydrogen and oxygen producing heat. Therefore, the membrane degrades, and the durability and service life of the fuel cell are reduced. Two diagnostic methods for determining the presence/absence of cross-leak and the progress thereof have been proposed.

(1) A method is disclosed in Japanese Patent Application Laid-Open Publication No. 9-27336 in which the amount of cross-leak is determined from the change in the cell voltage that occurs when a fuel gas is supplied to the anode side and an oxidizing gas is supplied to the cathode side.

(2) A method is known in which the two electrodes are filled with an inert gas, such as nitrogen or the like, with a differential pressure between the two electrodes, and the amount of pressure change per unit time is measured as an amount of cross-leak.

However, both methods have problems. The first method lacks quantitative performance. In the second method, determination of the amount of cross-leak of each cell is not possible if cells are in a stacked state. To determine the amount of cross-leak of each cell of a stack in the second method, the stack must be disassembled into individual cells for separate measurement.

SUMMARY OF THE INVENTION

It is an object of the invention to provide a fuel cell diagnostic method in which the amount of cross-leak can be quantitatively determined, and in which the amount of cross-leak of each cell in a stacked state can be determined.

In order to achieve the aforementioned object, in an aspect of a diagnostic method for a fuel cell according to the invention, (1) an anode of the fuel cell is supplied with hydrogen or a hydrogen-containing gas, and (2) a cathode is supplied with an inert gas or is vacuumed, and (3) a voltage of each cell is measured. An amount of cross-leak is determined based on the voltage of each cell.

According to the above-described aspect of the invention, when the anode is supplied with hydrogen and the cathode is supplied with an inert gas (e.g., nitrogen), an electromotive force dependent on the difference between the concentration of hydrogen on the anode side and the concentration of hydrogen on the cathode side (that is, a difference in partial pressure between the above two concentrations) is generated in a cell. By monitoring the thus-generated voltage of each cell, the amount of cross-leak of each cell can be quantitatively determined.

In the above-described aspect, the amount of hydrogen cross-leak of a cell may be determined from the voltage of the cell generated based on a principle of a hydrogen concentration cell. Furthermore, the voltage of each cell may be measured in a state where a plurality of cells of the fuel cell is stacked. Still further, at least one of the gas pressure on the anode side and the gas pressure on the cathode side may be changed at the time of measurement of the voltage of each cell. By changing the gas pressure or the coolant temperature, various operational states of the fuel battery cell can be created. Therefore, the amounts of cross-leak of each cell in such various states can be determined, and can be estimated according to the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

A fuel cell in accordance with the invention will now be described with reference to FIGS. 1 to 6. A fuel cell to which the invention may be applied is a low-temperature type fuel cell, for example, a polymer electrolyte fuel cell, such as fuel cell 10. The fuel cell 10 may be installed in, for example, a fuel cell vehicle. However, the fuel cell 10 may be used for other purposes.

Figure 4:
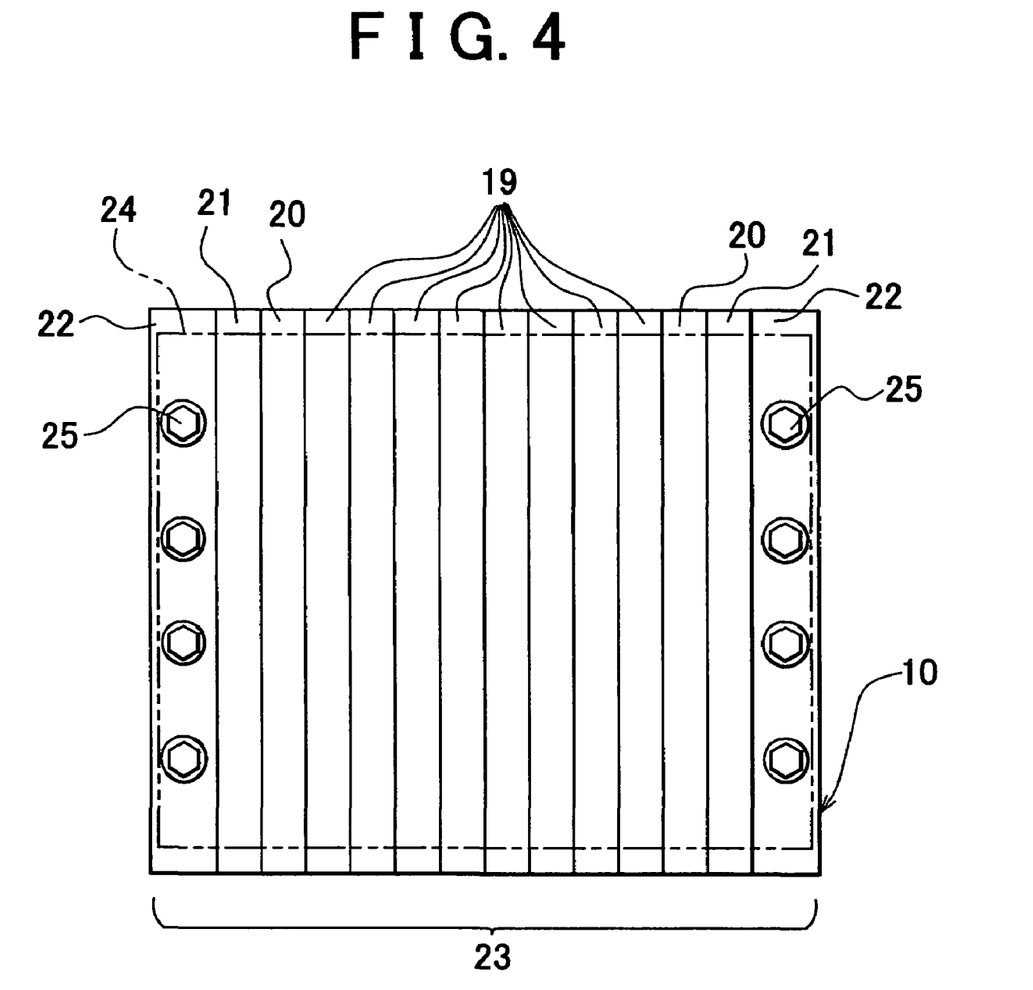
FIG. 4 is a side view of a fuel cell stack of a fuel cell in accordance with the invention.
Figure 5:
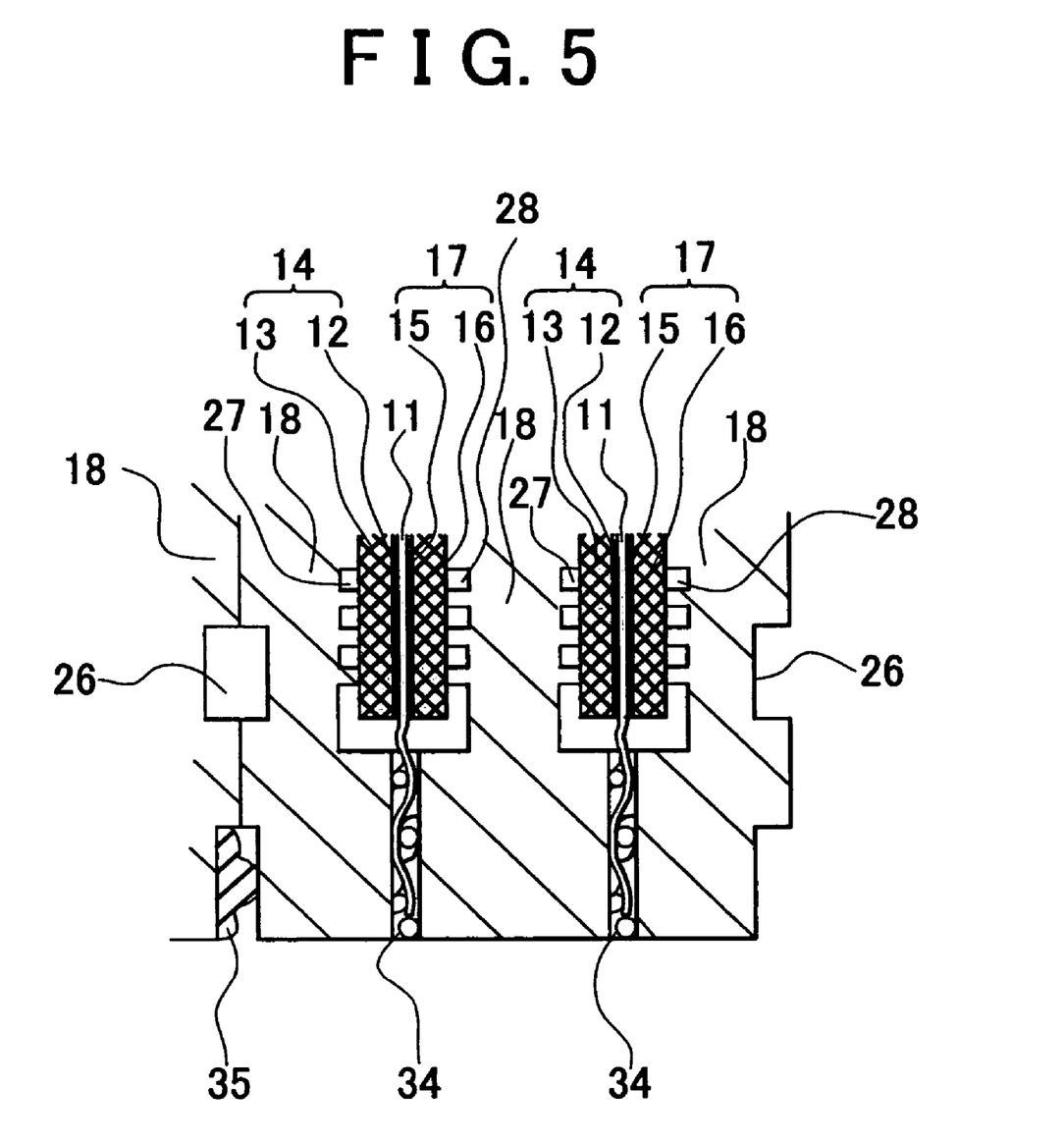
FIG. 5 is an enlarged view of a portion of the fuel cell stack shown in FIG. 4.

The polymer electrolyte fuel cell 10 is formed by a stack of membrane-electrode assemblies (MEAs) and separators 18 as those shown in FIGS. 4 and 5. Each membrane-electrode assembly is made up of an electrolyte membrane 11 formed by an ion-exchange membrane, an electrode (anode or fuel electrode) 14 formed by a catalyst layer 12 that is disposed on a surface of the electrolyte membrane 11, and an electrode (cathode or air electrode) 17 formed by a catalyst layer 15 that is disposed on an opposite surface of the electrolyte membrane 11. Diffusion layers 13, 16 are provided between each membrane-electrode assembly and a separator 18 disposed at the anode side of the assembly and between the membrane-electrode assembly and a separator 18 disposed at the cathode side. A fuel cell stack is formed by stacking modules, each of which includes at least one cell that is formed by stacking a membrane-electrode assembly and a separator 18. Terminals 20, insulators 21, and end plates 22 are disposed on two opposite ends of a cell stack in the cell stacking direction. The cell stack is clamped in the cell stacking direction, and is fixed through the use of fastener members (e.g., tension plates 24) that extend outside the cell stack in the cell stacking direction, and also through the use of bolts and nuts 25. In this manner, a stack 23 is formed.

The separators 18 are formed of carbon, or a metal, or a metal and a resin frame, or an electrically conductive resin, or a combination thereof. In the embodiment shown in the drawings, the separators 18 are carbon-made separators. However, the separators 18 may be formed of a material other than carbon. Each separator 18 has a fuel gas channel 27 for supplying a fuel gas (such as hydrogen) to the adjacent anode 14, and an oxidizing gas channel 28 for supplying an oxidizing gas (such as oxygen, or air in ordinary cases) to the adjacent cathode 17. The fuel gas and the oxidizing gas are both reaction gases. Each separator further has a coolant channel 26 for conducting a coolant (cooling water in ordinary cases). A coolant channel 26 is provided for each cell, or for each set of at least one cell (e.g., for each module).

Figure 6:
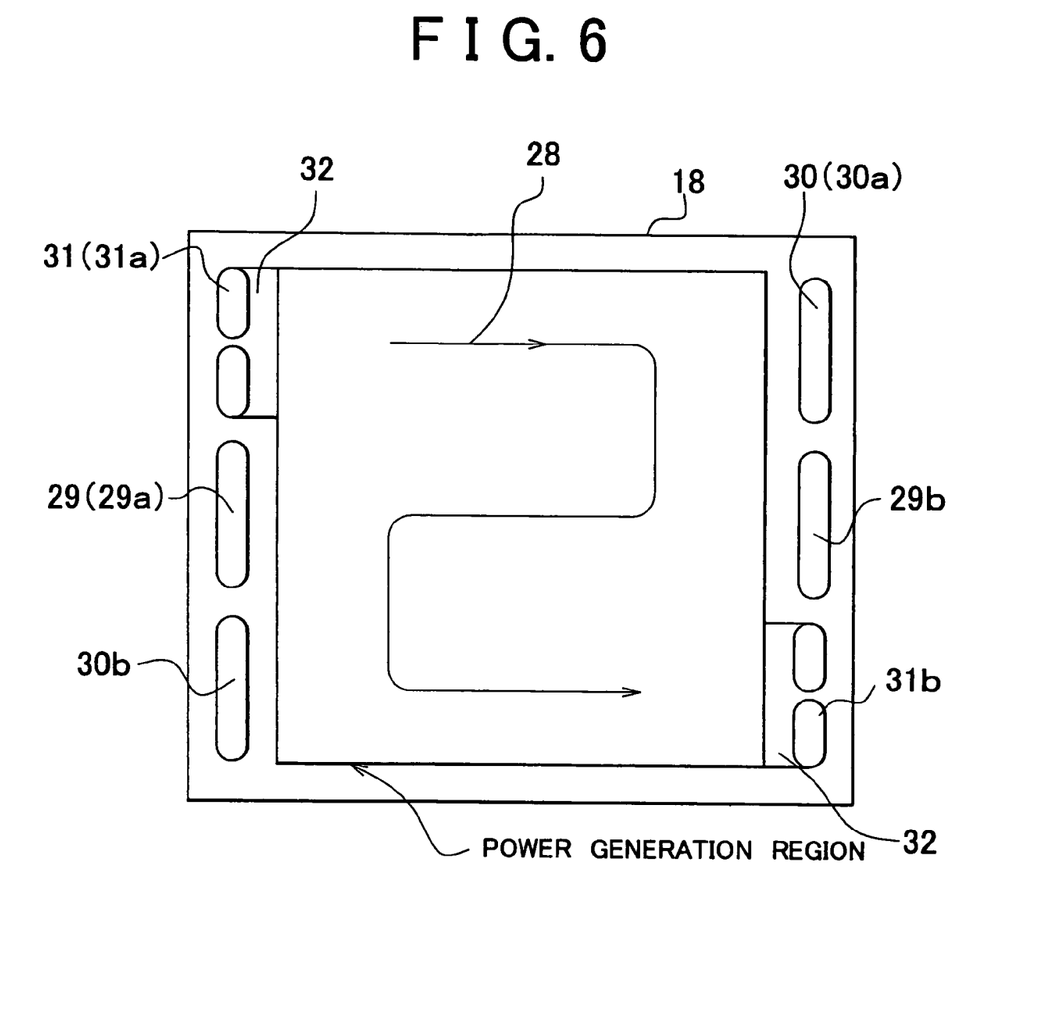
FIG. 6 is a front elevation of a cell partially shown in FIG. 4.

As shown in FIG. 6, each separator 18 has a coolant manifold 29, a fuel gas manifold 30, and an oxidizing gas manifold 31 that extend through the separator in the cell stacking direction. The coolant manifold 29 has an inlet side 29a and an outlet side 29b. The coolant flows through the coolant channel 26 of each cell, from the inlet side 29a to the outlet side 29b. The fuel gas manifold 30 has an inlet side 30a and an outlet side 30b. The fuel gas flows through the fuel gas channel 27 of each cell, from the inlet side 30a and the outlet side 30b. The oxidizing gas manifold 31 has an inlet side 31a and an outlet side 31b. The oxidizing gas flows through the oxidizing gas channel 28 of each cell, from the inlet side 31a to the outlet side 31b.

Figure 1:
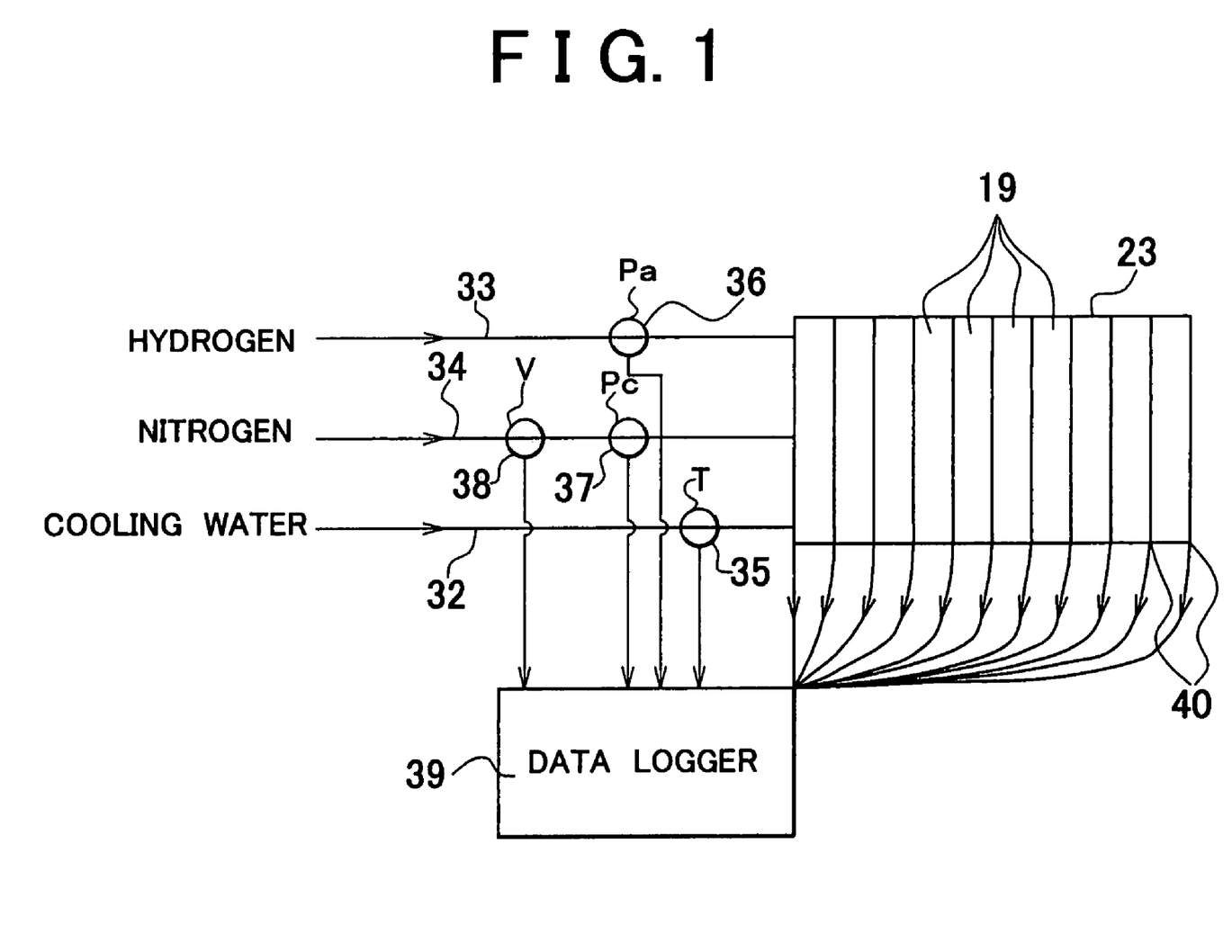
FIG. 1 is a system diagram of an apparatus that executes a fuel cell diagnostic method in accordance with the invention.

As shown in FIG. 1, a coolant (such as cooling water) piping 32 is connected to the coolant manifold 29. A fuel gas piping 33 is connected to the fuel gas manifold 30. An oxidizing gas piping 34 is connected to the oxidizing gas manifold 31.

As shown in FIG. 1, cell voltage monitors 40 are attached to cells 19. The cell voltage monitors 40 are provided separately for each cell 19 of the stack 23, or for each set of plurality of cells 19, so as to detect the electric potential of each cell 19 or each set of cells 19 connected to the cell voltage monitors 40. The cell voltage monitors 40 are attached to the separators 18 of cells 19. The stack 23 formed by stacking cells 19, the coolant piping 32, the fuel gas piping 33, the oxidizing gas piping 34, and the cell voltage monitors 40 are needed for operation of the fuel cell, and can be directly used for a cross-leak test.

For the cross-leak test, measurement devices and a computer (data logger) as described below are provided. The coolant piping 32 is provided with a temperature detector, for example, a thermocouple 35, for measuring the cooling water temperature. The fuel gas piping 33 is provided with a manometer 36 for measuring the gas pressure (such as the hydrogen pressure at the time of the cross-leak test) in the fuel gas piping 33. The oxidizing gas piping 34 is provided with a manometer 37 for measuring the gas pressure (such as the nitrogen pressure at the time of the cross-leak test) in the oxidizing gas piping 34, and also with a mass flow controller (for $N_2$). The values measured by the thermocouple 35, the values measured by the manometer 36, the values measured by the manometer 37, and the values detected by the cell voltage monitors 40 are transmitted and input to the computer (data logger) 39.

The electromotive force E of each cell 19 is determined from the potential difference between cells 19 input to the data logger 39. For example, in FIG. 1, assuming that the potential of the separator 18 of the cell 19 at an end of the stack which is detected by a corresponding one of the cell voltage monitors 40 is 0.07 V, and that the detected potential of the separator 18 of the contiguous cell 19 is 0.14 V, and that the detected potential of the separator 18 of the next neighboring cell 19 is 0.21 V, then the potential difference between the separators 18 on the opposite sides of the membrane 11 of the cell 19 disposed at the end of the stack, that is, the electromotive force E of the cell 19 at the end of the stack, is 0.07 V. Likewise, the electromotive force of the contiguous cell 19 is 0.14 V-0.07 V=0.07 V, and the electromotive force of the next neighboring cell 19 is 0.21 V-0.14 V=0.07 V.

The fuel cell diagnostic method of the invention performed in the above-described apparatus is a method in which the amount of cross-leak is determined by introducing hydrogen or a hydrogen-containing gas to the anodes 14 of the fuel cell 10, and introducing an inert gas to the cathodes 17 of the fuel cell 10 or vacuuming the cathodes 17, and then measuring cell voltages. The measurement and determination of amounts of cross-leak is performed while the stack 23 formed by stacking the cells 19 is maintained.

When the anode side 14 is supplied with hydrogen or a hydrogen-containing gas and the cathode side 17 is supplied with an inert gas (e.g., nitrogen) or is vacuumed, an electromotive force E dependent on the difference between the concentration of hydrogen on the anode side 14 and the concentration of hydrogen on the cathode side 17 (difference in partial pressure) is generated in each cell 19. Namely, a voltage is generated in each cell based on a principle of a hydrogen concentration cell. The electromotive force E obeys Nernst's equation as follows.

$$E = 2.3026 \times \{(RT)/(2F)\} \times \log_{10}\{P_{H2}(a)/P_{H2}(c)\} \quad (1)$$

where

E: electromotive force of a cell (potential difference detected by cell voltage monitors 40)

R: gas constant=8.31 (J/mol·K)

F: Faraday constant

T: temperature (° K) (measured by the thermocouple 35)

$P_{H2}$(a): anode-side, or anode hydrogen pressure (KPa abs) (measured by the monometer 36)

The cathode-side hydrogen partial pressure $P_{H2}$(C) can be determined by substituting the values measured by the manometer 36, the thermocouple 35 and the cell voltage monitors 40 in the equation (1).

The cathode-side, or cathode hydrogen partial pressure $P_{H2}$(c) and the amount of cross-leak of the membrane of the cell have a relationship expressed by the following equation (2).

$$P_{H2}(c) = \{(\text{cross-leak amount})/(\text{cathode-side gas amount})\} \times P_{TOTAL}(c) \quad (2)$$

where $P_{TOTAL}$(C): total pressure (KPa abs) (measured by the manometer 37) of the inert gas on the cathode side The following approximation is used in the equation (2).

(cathode-side gas amount)=(flow of nitrogen)+(cross-leak amount)≈(flow of nitrogen)

Then, the cathode-side gas amount is measured by the mass flow controller 38.

The amount of cross-leak of each cell can be determined through the calculation of the equation (2), using the value determined by the equation (1) for $P_{H2}$(C), the value measured by the manometer 37 for $P_{TOTAL}$(C), and the value measured by the mass flow controller 38 for the cathode-side gas amount. The summation of the amounts of cross-leak of the individual cells provides the total amount of cross-leak of all the cells of the stack 23. Thus, it becomes possible to quantitatively determine the amount of cross-leak of each of cells in a stacked state, which is impossible according to the conventional measurement methods.

Figure 2:
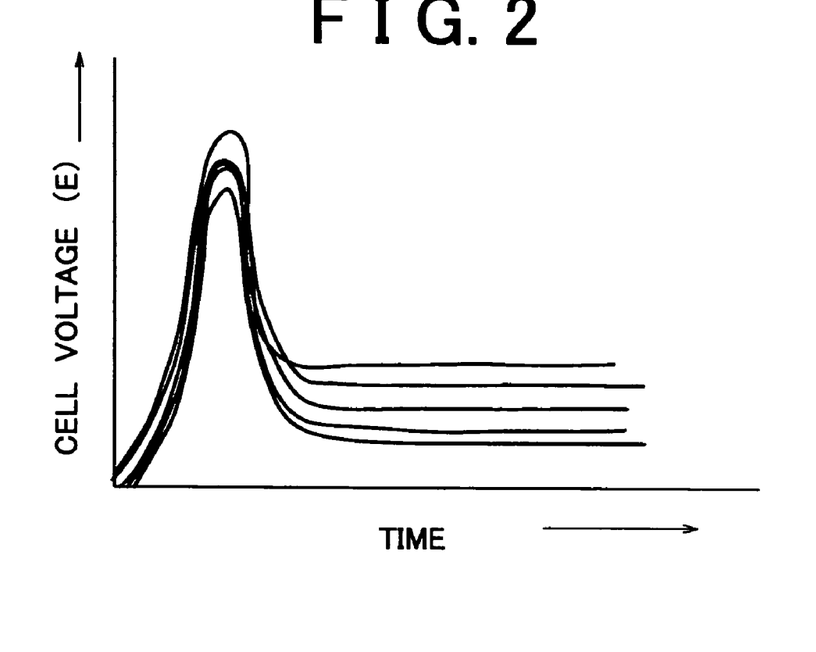
FIG. 2 is a graph indicating a relationship between the cell voltage (electromotive force of each cell) and time in the fuel cell diagnostic method in accordance with the invention.

FIG. 2 is a graph indicating a relationship between the cell voltage (electromotive force of each cell) E and time, where the cell voltage of each cell 19 has been determined as a difference between the potentials of cells measured by cell voltage monitors 40. In FIG. 2, the cell voltage (electromotive force of each cell) E changes in a crest fashion due to the effect of air remaining on the cathode-side in the fuel cell from a normal operation of the fuel cell. However, the air is immediately replaced by nitrogen, so that the cell voltage (electromotive force of each cell) E substantially converges to a constant value over time. The constant value of convergence of cell voltage (electromotive force of each cell) E normally varies depending on individual cells.

Figure 3:
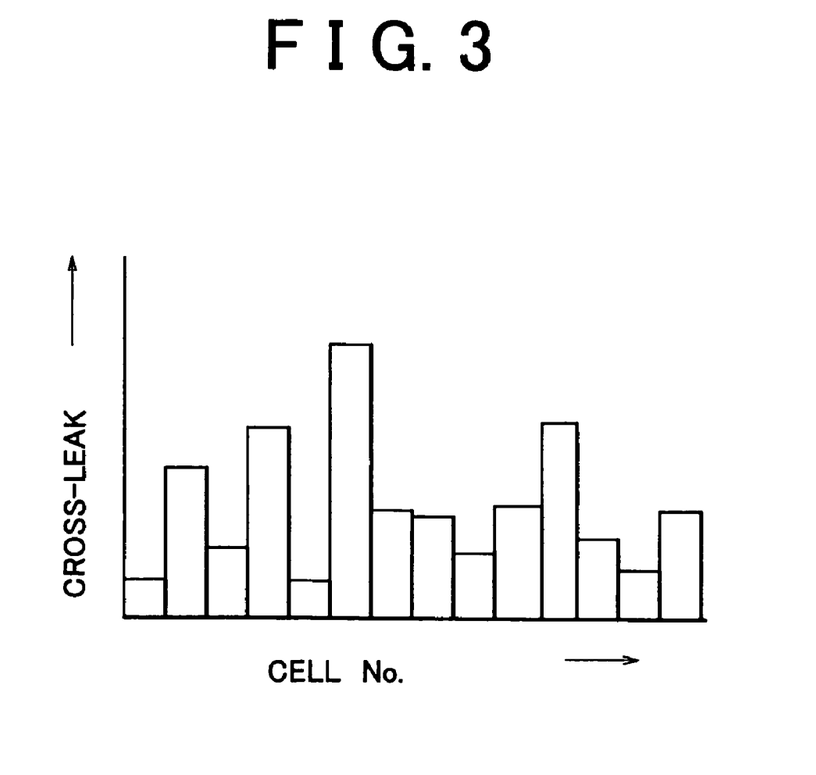
FIG. 3 is a bar chart indicating the amounts of cross-leak of cells in the fuel cell diagnostic method in accordance with the invention.

FIG. 3 indicates the amounts of cross-leak of individual cells each determined through the calculation of the equation (2) using the value of $P_{H2}$(C) which has been determined through the calculation of the equation (1) using E determined in FIG. 2. In FIG. 3, CELL No. indicates the cell numbers assigned to the cells from one end to the other end of the stack. As indicated in FIG. 3, the amount of cross-leak of each cell 19 can be quantitatively determined. The amounts of cross-leak of cells indicated in FIG. 3 are the amounts determined in a stacked state of the cells.

Although in the foregoing embodiment, the inert gas supplied to the cathode side is nitrogen, the inert gas is not limited to nitrogen, but may instead be helium, argon or the like. Vacuuming also serves this purpose. If an increased number of monometers 36, 37 are provided for both the gas inlet side and the gas outlet side, it becomes possible to narrow down the location of leak in a cell surface, that is, to determine whether the location of leak is closer to the gas inlet or the gas outlet.

Furthermore, if the pressures on the anode 14 and the cathode 17 are varied, for example, if a differential pressure is provided between the anode 14 and the cathode 17 for measurement, it becomes possible to grasp the degree of degradation (degree of perforation) of the membrane 11. For example, if a change in the differential pressures during measurement causes a great change in the amounts of cross-leak of a cell, the membrane of the cell is considered to have a hole. Furthermore, by changing the temperature of the coolant (cooling water), the temperature dependency of the amounts of cross-leak can be determined. Still further, if measurement is performed with at least one of the pressure and the temperature changed within the range of pressure or temperature of a normal operation region of the fuel cell, the amount of cross-leak and the membrane degradation in the normal operation region can be estimated, so that the durability and reliability of the membrane 11 and the fuel cell 10 can be grasped.

The foregoing is a detailed description of particular embodiments of the present invention as defined in the claims set forth below. The invention embraces all alternatives, modifications and variations that fall within the letter and spirit of the claims, as well as all equivalents of the claimed subject matter.

What is claimed is:

1. A diagnostic method for a fuel cell comprising a plurality of cells, comprising:

supplying an anode of the fuel cell with hydrogen or a hydrogen-containing gas;

supplying a cathode with an inert gas or vacuuming the cathode;

detecting an amount of the inert gas supplied to the cathode;

measuring a gas pressure at the anode;

measuring a gas pressure at the cathode;

measuring a voltage of each cell under a condition in which the hydrogen or the hydrogen-containing gas is supplied to the anode of the fuel cell and the inert gas is supplied to the cathode or the cathode is vacuumed, wherein an operation state of the fuel cell is changed when measuring the voltage of a cell;

introducing a cooling medium into a passage within the fuel cell;

changing a temperature of the cooling medium when measuring the voltage of each cell; and determining an amount of cross-leak based on the measured gas pressure at the anode, the measured gas pressure at the cathode, and on a measured voltage of each cell, wherein in the determining step, an amount of hydrogen cross-leak of each cell is determined from the measured voltage of each cell generated based on a principle of a hydrogen concentration cell, and wherein the amount of cross-leak is calculated based on the pressure of the hydrogen-containing gas at the cathode, on the total pressure of the inert gas supplied to the cathode, and on the amount of the inert gas supplied to the cathode.

2. The diagnostic method according to claim 1, wherein the voltage of each cell is measured in a state where the plurality of cells are stacked.

3. The diagnostic method according to claim 1, further comprising changing at least one of the gas pressure at the anode and the gas pressure at the cathode when measuring the voltage of each cell.

4. The diagnostic method according to claim 1, wherein the inert gas supplied to the cathode is nitrogen.

5. The diagnostic method of claim 1, wherein the changing a temperature of the cooling medium changes the temperature of the fuel cell from a first temperature in the range of normal operation to a second temperature within the range of normal operation.

6. The diagnostic method according to claim 1, wherein the pressure of the hydrogen-containing gas at the cathode is calculated using the equation, $$E = 2.3026 \times \{(RT)/(2F)\} \times \log_{10}\{P_{H2}(a)/P_{H2}(c)\},$$
wherein E: electromotive force of a cell (potential difference detected by cell voltage monitors 40)

R: gas constant=8.31 (J/mol·K)

F: Faraday constant

T: temperature (° K)

$P_{H2}(a)$: anode-side, or anode hydrogen pressure (KPa abs).

7. The diagnostic method according to claim 1, wherein the total pressure of the inert gas supplied to the cathode is a value measured by a manometer located in supply piping for the inert gas.

8. The diagnostic method according to claim 1, wherein the amount of the inert gas supplied to the cathode is calculated at least in part on a value measured by a mass flow controller located in supply piping for the inert gas.

9. A diagnostic method for a fuel cell comprising a plurality of cells, comprising:

supplying, via hydrogen gas supply piping, an anode of the fuel cell with hydrogen or a hydrogen-containing gas;

supplying, via inert gas supply piping, a cathode with an inert gas or vacuuming the cathode;

supplying, via cooling piping, a cooling medium into a passage within the fuel cell;

measuring a pressure of the hydrogen gas in the hydrogen supply piping with a manometer;

measuring a pressure of the inert gas in the inert gas supply piping with a manometer and a amount of the inert gas with a mass flow controller;

measuring a temperature of the cooling medium in the cooling medium piping;

measuring a gas pressure at the anode;

measuring a gas pressure at the cathode;

measuring a voltage of each cell under a condition in which the hydrogen or the hydrogen-containing gas is supplied to the anode of the fuel cell and the inert gas is supplied to the cathode or the cathode is vacuumed;

changing a temperature of the cooling medium, or at least one of the gas pressure at the anode or cathode when measuring the voltage of each cell, in order to change an operational state of the fuel cell when measuring the voltage of a cell; and determining the amount of cross-leak of each cell by calculating the following equation, $$P_{H2}(c) = \{(\text{cross-leak amount})/(\text{cathode-side gas amount})\} \times P_{TOTAL}(c), \text{wherein}$$

(i) $P_{H2}(C)$ is calculated by using the equation, $$E = 2.3026 \times \{(RT)/(2F)\} \times \log_{10}\{P_{H2}(a)/P_{H2}(c)\},$$
wherein E: electromotive force of a cell (potential difference detected by cell voltage monitors 40)

R: gas constant=8.31 (J/mol·K)

F: Faraday constant

T: temperature (° K)

$P_{H2}(a)$: anode-side, or anode hydrogen pressure (KPa abs);

(ii) $P_{TOTAL}(C)$ is a value measured by the manometer located in the inert gas supply piping; and (iii) the cathode-side gas amount is calculated, at least in part, on the value measured by the mass flow controller.

* * * * *

UNITED STATES PATENT AND TRADEMARK OFFICE
CERTIFICATE OF CORRECTION

PATENT NO. : 7,597,977 B2  
APPLICATION NO. : 10/735694  
DATED : October 6, 2009  
INVENTOR(S) : Shigetaka Hamada et al.

Page 1 of 1

It is certified that error appears in the above-identified patent and that said Letters Patent is hereby corrected as shown below:

| Column | Line | |
|---|---|---|
| 5 | 21 | Change "pressure $P_{H2}(C)$" to --pressure $P_{H2}(c)$--. |
| 5 | 34 | Change "$P_{TOTAL}(C)$" to --$P_{TOTAL}(c)$--. |
| 5 | 44 | Change "$P_{H2}(C)$" to --$P_{H2}(c)$--. |
| 5 | 45 | Change "$P_{TOTAL}(C)$" to --$P_{TOTAL}(c)$--. |
| 6 | 1 | Change "$P_{H2}(C)$" to --$P_{H2}(c)$--. |
| 8 | 30 | Change "$P_{H2}(C)$" to --$P_{H2}(c)$--. |
| 8 | 40 | Change "$P_{TOTAL}(C)$" to --$P_{TOTAL}(c)$--. |

Signed and Sealed this

Eleventh Day of May, 2010

David J. Kappos
*Director of the United States Patent and Trademark Office*